United States Patent
Yi

(10) Patent No.: US 8,795,891 B2
(45) Date of Patent: Aug. 5, 2014

(54) POSITIVE ELECTRODE ACTIVE MATERIAL FOR LITHIUM SECONDARY BATTERY, METHOD OF PREPARING THE SAME, POSITIVE ELECTRODE FOR LITHIUM SECONDARY BATTERY INCLUDING THE SAME, AND LITHIUM SECONDARY BATTERY INCLUDING THE POSITIVE ELECTRODE

(75) Inventor: Seung-Beob Yi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 13/476,847

(22) Filed: May 21, 2012

(65) Prior Publication Data

US 2013/0022869 A1    Jan. 24, 2013

(30) Foreign Application Priority Data

Jul. 18, 2011  (KR) .................. 10-2011-0071084

(51) Int. Cl.
| | | |
|---|---|---|
| *H01M 4/13* | (2010.01) | |
| *H01M 4/485* | (2010.01) | |
| *H01M 4/505* | (2010.01) | |
| *H01M 4/525* | (2010.01) | |
| *H01M 4/131* | (2010.01) | |

(52) U.S. Cl.
CPC .............. *H01M 4/485* (2013.01); *H01M 4/505* (2013.01); *H01M 4/525* (2013.01); *H01M 4/131* (2013.01)
USPC ........................................ 429/218.1; 429/209

(58) Field of Classification Search
CPC ...... H01M 4/485; H01M 4/505; H01M 4/525
USPC .......................................................... 429/322
See application file for complete search history.

(56) References Cited

U.S. PATENT DOCUMENTS

| | | | |
|---|---|---|---|
| 6,277,521 B1 | 8/2001 | Gao et al. | |
| 6,531,220 B1 | 3/2003 | Kweon et al. | |
| 6,579,475 B2 | 6/2003 | Gao et al. | |
| 6,582,852 B1 | 6/2003 | Gao et al. | |
| 6,794,085 B2 | 9/2004 | Gao et al. | |
| 2004/0142241 A1* | 7/2004 | Nagayama et al. | 429/231.3 |
| 2004/0229124 A1* | 11/2004 | Miyamoto et al. | 429/231.1 |
| 2007/0117014 A1 | 5/2007 | Saito et al. | |

FOREIGN PATENT DOCUMENTS

| | | |
|---|---|---|
| JP | 2002-352802 A | 12/2002 |
| JP | 2003-516297 A | 5/2003 |
| JP | 4326041 B | 6/2009 |
| KR | 2000-0073492 A | 12/2000 |

(Continued)

OTHER PUBLICATIONS

Machine English Translation of JP2002-352802, 23 pages.

(Continued)

*Primary Examiner* — Gary Harris
(74) *Attorney, Agent, or Firm* — Christie, Parker & Hale, LLP

(57) ABSTRACT

A positive electrode active material for a lithium secondary battery includes a lithium cobalt complex oxide containing an alkali earth metal and a transition metal in a predetermined mixture ratio. A method of preparing the positive electrode active material includes mixing a lithium salt, a transition metal precursor, and an alkali earth metal salt to form a mixture, and performing at least one thermal treatment on the mixture. A positive electrode for a lithium secondary battery includes the positive electrode active material, and a lithium secondary battery includes the positive electrode.

11 Claims, 3 Drawing Sheets

(56) References Cited

FOREIGN PATENT DOCUMENTS

| | | |
|---|---|---|
| KR | 2001-0002212 | 1/2001 |
| KR | 2001-0002785 | 1/2001 |
| KR | 2007-0033337 A | 3/2007 |

OTHER PUBLICATIONS

KIPO Registration Determination Certificate dated Sep. 30, 2013 for priority application No. 10-2011-0071084 (6 pages).

* cited by examiner

POSITIVE ELECTRODE ACTIVE MATERIAL FOR LITHIUM SECONDARY BATTERY, METHOD OF PREPARING THE SAME, POSITIVE ELECTRODE FOR LITHIUM SECONDARY BATTERY INCLUDING THE SAME, AND LITHIUM SECONDARY BATTERY INCLUDING THE POSITIVE ELECTRODE

CROSS-REFERENCE TO RELATED PATENT APPLICATION

This application claims priority to and the benefit of Korean Patent Application No. 10-2011-0071084, filed on Jul. 18, 2011 in the Korean Intellectual Property Office, the entire content of which is incorporated herein by reference.

BACKGROUND

1. Technical Field

The present invention relates to a positive electrode active material for a lithium secondary battery, a method of preparing the positive electrode active material, a positive electrode for a lithium secondary battery including the positive electrode active material, and a lithium secondary battery including the positive electrode.

2. Description of Related Art

Recently, the use of lithium secondary batteries as power sources for mobile phones, camcorders, and laptops has increased remarkably. The positive electrode active material affects the capacity of the lithium secondary battery. As such, whether a lithium secondary battery is usable for a long time at high efficiency or maintains its initial capacity after charging and discharging cycles depends on the chemical characteristics of the positive electrode active material.

Examples of positive electrode active materials used in lithium secondary batteries include lithium transition metal compounds, such as $LiCoO_2$, $LiMn_2O_4$, $LiNiO_2$, and $LiMnO_2$.

However, the characteristics (such as capacity and lifetime) of positive electrode active materials developed so far are not satisfactory. Thus, there have been attempts to substitute an element of the positive electrode active material with another element, or add another element to the positive electrode active material.

SUMMARY

Embodiments of the present invention provide a positive electrode active material for a lithium secondary battery having improved lifetime and capacity characteristics. Other embodiments provide a method of preparing the positive electrode active material. Still other embodiments provide a positive electrode for a lithium secondary battery including the positive electrode active material. Yet other embodiments provide a lithium secondary battery including the positive electrode.

According to an aspect of the present invention, a positive electrode active material for a lithium secondary battery is represented by Formula 1 below:

$$Li_xM'_yM''_zCo_{1-y-z}O_2 \qquad \text{Formula 1}$$

In Formula 1, M' is an alkali earth metal, M" is a transition metal, $0.10 \leq x \leq 1.95$, $0.0015 \leq y \leq 0.0510$, $0.0005 \leq z \leq 0.0100$, and $3.1 \leq y/z \leq 5.1$. M' may be beryllium (Be), magnesium (Mg), calcium (Ca), strontium (Sr), barium (Ba), or radium (Ra). M" may be titanium (Ti), scandium (Sc), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), ruthenium (Ru), rhodium (Rh), palladium (Pd), silver (Ag), cadmium (Cd), iridium (Ir), osmium (Os), tungsten (W), platinum (Pt), or gold (Au).

According to another aspect of the present invention, a lithium secondary battery includes: a positive electrode including the positive electrode active material; a negative electrode; and a separator between the positive and negative electrodes.

BRIEF DESCRIPTION OF THE DRAWINGS

The above and other features and advantages of the present invention will become more apparent by reference to the following detailed description when considered in conjunction with the attached drawings in which.

DETAILED DESCRIPTION OF THE INVENTION

Figure 1:
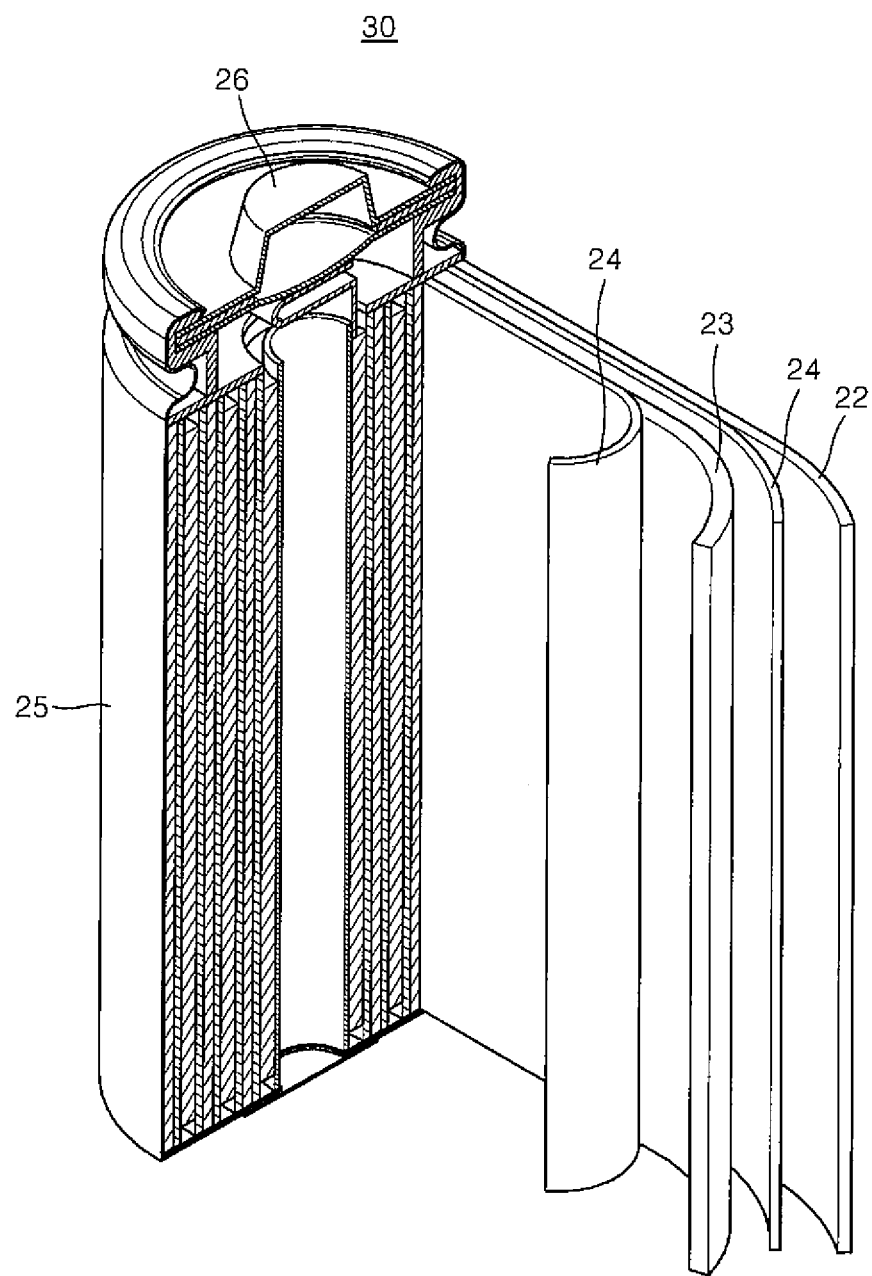
FIG. 1 is a cross-sectional perspective view of a structure of a lithium secondary battery according to an embodiment of the present invention.

Hereinafter, the present invention will be described with reference to the accompanying drawings, in which exemplary embodiments of the invention are shown.

According to embodiments of the present invention, a positive electrode active material for a lithium secondary battery comprises a material represented by Formula 1 below.

$$Li_xM'_yM''_zCo_{1-y-z}O_2 \qquad \text{Formula 1}$$

In Formula 1, M' is an alkali earth metal, M" is a transition metal, $0.10 \leq x \leq 1.95$, $0.0015 \leq y \leq 0.0510$, $0.0005 \leq z \leq 0.0100$, and $3.1 \leq y/z \leq 5.1$. For example, M' may be beryllium (Be), magnesium (Mg), calcium (Ca), strontium (Sr), barium (Ba), or radium (Ra). For example, M" may be titanium (Ti), scandium (Sc), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), ruthenium (Ru), rhodium (Rh), palladium (Pd), silver (Ag), cadmium (Cd), iridium (Ir), osmium (Os), tungsten (W), platinum (Pt), or gold (Au).

According to one embodiment, M' is Mg and M" is Ti.

In Formula 1, x, y, and z may be respectively $0.95 \leq x \leq 1.05$, $0.0056 \leq y \leq 0.0081$, and $0.0016 \leq s \leq 0.0018$.

In Formula 1, y/z is from 3.1 to 5.1. When y/z is within this range, the positive electrode employing the positive electrode active material may have good lifetime characteristics.

In some embodiments, for example, y/z may be from 3.1 to 5.1. In other embodiments, y/z may be 3.1, 4.0, or 5.1.

If y/z is less than 3.1, the positive electrode employing the positive electrode active material may not have long lifetime characteristics. If y/z is more than 5.1, the positive electrode or battery employing the positive electrode active material may have reduced capacity.

Examples of the positive electrode active material represented by Formula 1 above include $Li_{1.00}Mg_{0.0072}Ti_{0.0018}Co_{0.9910}O_2$, $Li_{1.00}Mg_{0.0056}Ti_{0.0018}Co_{0.9926}O_2$, and $Li_{1.00}Mg_{0.0081}Ti_{0.0016}Co_{0.9903}O_2$.

M' may be distributed in a concentration gradient from the surface layer to the center portion of the positive electrode active material. The term "surface layer" denotes an area from the surface to 1 to 2 μm toward the center portion when the positive electrode active material is a spherical particle. The term "center portion" denotes an area from the internal center to 1 to 2 μm toward the surface when the positive electrode active material is a spherical particle.

Examples of M' include Mg and Ca. The different concentration gradient of M' may be checked via at least one of an elementary analysis, an M' mapping test, and an electron probe micro analyzer (EPMA).

The amount of M' gradually increases from the center portion to the surface layer. When the amount of M' gradually increases, the capacity, charging and discharging efficiency, and lifetime of the positive electrode or battery employing the positive electrode active material are improved.

A weight ratio of M' in the surface layer to M' in the center portion may be from 3:1 to 5:1, for example, from 3.26:1 to 3.86:1.

According to an embodiment of the present invention, M' is Mg and the amount of Mg gradually increases from the center portion to the surface layer. Here, the weight ratio of Mg in the surface layer to Mg in the center portion is from 3.26:1 to 3.86:1.

A method of preparing a positive electrode active material for a lithium secondary battery will now be described.

First, a lithium salt, a transition metal precursor, and an alkali earth metal salt are mixed together to obtain a mixture.

Here, lithium carbonate ($Li_2CO_3$), lithium sulfate ($Li_2SO_4$), lithium nitrate ($LiNO_3$), or lithium hydroxide (LiOH) may be used as the lithium salt.

Cobalt oxide ($Co_3O_4$) or cobalt oxyhydroxide (CoOOH) may be used as the transition metal precursor.

Titanium oxide ($TiO_2$), magnesium carbonate, magnesium sulfate, magnesium nitrate, or magnesium hydroxide may be used as the alkali earth metal salt.

The amounts of the lithium salt, the transition metal precursor, and the alkali earth metal salt may be controlled such that the positive electrode active material of Formula 1 is obtained.

The amount of the transition metal precursor may be from about 0.9406 to about 1.0424 moles based on 1 mole of the lithium salt, and the amount of the alkali earth metal salt may be from about 0.0068 to about 0.0104 mole based on 1 mole of the lithium salt. When the amounts of the transition metal precursor and the alkali earth metal salt are within these ranges, the capacity and lifetime characteristics of the positive electrode or battery using the positive electrode active material of Formula 1 are improved.

Next, a first thermal treatment is performed on the mixture at a temperature from about 150 to 1050° C., for example, from about 500 to 1025° C., in an air or oxygen atmosphere.

If the alkali earth metal in the positive electrode active material has the above-described concentration gradient, a second thermal treatment may be performed on the mixture at a temperature from about 150 to about 1000° C., for example, from about 500 to about 700° C., in an air or oxygen atmosphere.

The first thermal treatment time differs based on the first thermal treatment temperature, but may be less than or equal to 30 hours, for examples, from 20 to 30 hours.

The second thermal treatment time differs based on the second thermal treatment temperature, but may be less than or equal to 25 hours, for example, 12 to 17 hours.

When the first and second thermal treatment temperatures are within the above ranges, the capacity and lifetime characteristics of the positive electrode or battery using the positive electrode active material are improved.

As described above, since the method is simple, the positive electrode active material may be easily prepared.

The capacity and capacity retention rate of the positive electrode or battery using the positive electrode active material are good, and the lifetime characteristic is improved.

The positive electrode active material may further include any lithium transition metal oxide conventionally used in lithium batteries. For example, the lithium transition metal oxide may be at least one selected from $LiCoO_2$, $LiNiO_2$, $LiMnO_2$, $LiMn_2O_4$, $Li(Ni_aCo_bMn_c)O_2$ (0<a<1, 0<b<1, 0<c<1, a+b+c=1), $LiNi_{1-Y}Co_YO_2$ (0≤Y<1), $LiCo_{1-Y}Mn_YO_2$ (0≤Y<1), $LiNi_{1-Y}Mn_YO_2$ (0≤Y<1), $LiMn_{2-z}Ni_zO_4$ (0<Z<2), $LiMn_{2-z}Co_zO_4$ (0<Z<2), $LiCoPO_4$, and $LiFePO_4$. According to an embodiment, the lithium transition metal oxide may be $LiCoO_2$.

The amount of the lithium transition metal oxide may be from 0.1 to 90 parts by weight based on 100 parts by weight of the positive electrode active material. When the amount of the lithium transition metal oxide is within this range, the capacity characteristics of the positive electrode active material are good.

A method of preparing a lithium secondary battery using the positive electrode active material will now be described. The lithium secondary battery includes a positive electrode, a negative electrode, a non-aqueous electrolyte containing a lithium salt, and a separator.

The positive and negative electrodes are prepared by coating and drying a composition for forming a layer of a positive electrode active material and a composition for forming a layer of a negative electrode active material, respectively, on a current collector.

The composition for forming the layer of the positive electrode active material is prepared by mixing the positive electrode active material described above, a conducting agent, a binder, and a solvent.

A conventional lithium transition metal oxide may be used together with the positive electrode active material described above.

The binder helps to bind the positive electrode active material and the conducting agent, and to bind the materials to the current collector. The amount of the binder may be from about 1 to about 50 parts by weight based on total 100 parts by weight of the positive electrode active material. Nonlimiting examples of the binder include polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene butadiene rubber, fluororubber, and various copolymers. The amount of the binder is from about 2 to about 5 parts by weight based on 100 parts by weight of the positive electrode active material. When the amount of the binder is within this range, the binding strength of the current collector to the positive electrode active material is increased.

The conducting agent is not limited as long as it is conductive and does not induce a chemical change in the lithium secondary battery. Examples of the conducting agent include graphite (such as natural graphite or artificial graphite); carbon-based materials (such as carbon black, acetylene black, Ketjen black, channel black, furnace black, lamp black, or summer black); conductive fibers (such as carbon fibers or metal fibers); metal powders (such as fluorocarbon, aluminum, nickel powder; conductive whiskers (such as zinc oxide or titanic acid potassium); conductive metal oxides (such as titanium oxide); and conductive materials (such as polyphenylene derivatives).

The amount of the conducting agent is from about 2 to about 5 parts by weight based on 100 parts by weight of the positive electrode active material. When the amount of the conducting agent is within this range, the conductive characteristics of the positive electrode are good.

A nonlimiting example of the solvent includes N-methylpyrrolidone.

The amount of the solvent is from about 1 to about 10 parts by weight based on 100 parts by weight of the positive electrode active material. When the amount of the solvent is within this range, formation of the layer of the positive electrode active material is easily performed.

The positive electrode current collector may have a thickness from about 3 to about 500 µm, and is not limited as long as it is highly conductive and does not induce a chemical change in the lithium secondary battery. The positive electrode current collector may include stainless steel, aluminum, nickel, titanium, thermal treated carbon, aluminum, or stainless steel surface-treated with carbon, nickel, titanium, or silver. The adhesive strength of the positive electrode active material may be increased by making the surface of the positive electrode current collector minutely uneven. The positive electrode current collector may have any one of various shapes, such as a film, a sheet, a foil, a net, a porous shape, a foam shape, or a non-woven shape.

The composition for forming the layer of the negative electrode active material is prepared by mixing a negative electrode active material, a binder, a conducting agent, and a solvent.

A material capable of intercalating and deintercalating lithium ions may be used as the negative electrode active material. Nonlimiting examples of the negative electrode active material include graphite, carbon-based materials such as carbon, lithium metal, alloys of lithium metal, and silicon oxide-based materials. According to an embodiment, the negative electrode active material may be a silicon oxide.

The amount of the binder is from about 1 to about 50 parts by weight based on 100 parts by weight of the negative electrode active material. Nonlimiting examples of the binder include those described above with respect to the binder of the positive electrode.

The amount of the conducting agent is from about 1 to about 5 parts by weight based on 100 parts by weight of the negative electrode active material. When the amount of the conducting agent is within this range, the conductive characteristics of the negative electrode are good.

The amount of the solvent is from about 1 to about 10 parts by weight based on 100 parts by weight of the negative electrode active material. When the amount of the solvent is within this range, formation of the layer of the negative electrode active material is easily performed.

The same conducting agent and solvent used to prepare the positive electrode may be used for the negative electrode.

The negative electrode current collector may have a thickness from about 3 to about 500 µm, and is not limited as long as it is highly conductive and does not induce a chemical change in the lithium secondary battery. The negative electrode current collector may include stainless steel, aluminum, nickel, titanium, thermal treated carbon, copper, stainless steel surface-treated with carbon, nickel, titanium, or silver, or an aluminum-cadmium alloy. The adhesive strength of the negative electrode active material may be increased by making the surface of the negative electrode current collector minutely uneven like the positive electrode current collector.

The negative electrode current collector may have any one of various shapes, such as a film, a sheet, a foil, a net, a porous shape, a foam shape, or a non-woven shape.

A separator is disposed between the positive electrode and the negative electrode prepared as above. The pore diameter of the separator may be from about 0.01 to about 10 µm, and the thickness of the separator may generally be from about 5 to about 300 µm. An olefin-based polymer (such as polypropylene or polyethylene) or a sheet or non-woven cloth formed of glass fiber may be used as the separator. If a solid electrolyte, such as a polymer, is used as an electrolyte, the solid electrolyte may also operate as the separator.

The non-aqueous-based electrolyte containing a lithium salt includes a non-aqueous electrolyte and a lithium salt. Examples of the non-aqueous electrolyte include a non-aqueous electrolyte solution, an organic solid electrolyte, and an inorganic solid electrolyte.

Nonlimiting examples of the non-aqueous electrolyte solution include non-protogenic organic solvents, such as N-methyl-2-pyrrolidinone, propylene carbonate, ethylene carbonate, butylene carbonate, dimethyl carbonate, diethyl carbonate, gamma-butyrolactone, 1,2-dimethoxyethane, 2-methyl tetrahydrofuran, dimethylsulfoxide, 1,3-dioxolane, formamide, dimethylformamide, dioxolane, acetonitrile, nitromethane, formic acid methyl ester, acetic acid methyl ester, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Nonlimiting examples of the organic solid electrolyte include polyethylene derivatives, polyethylene oxide derivatives, polypropylene oxide derivatives, phosphoric acid ester polymer, polyester sulfide, polyvinyl alcohol, and polyvinylidene fluoride.

Nonlimiting examples of the inorganic solid electrolyte include nitrides, halides, and sulfates of Li, such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt may easily dissolve in the non-aqueous-based electrolyte. Nonlimiting examples of the lithium salt include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloro borate, short chain aliphatic carbonic acid lithium, tetraphenyl boric acid lithium, and lithium imide salts.

FIG. 1 is a cross-sectional perspective view of a structure of a lithium battery 30 according to an embodiment of the present invention. Referring to FIG. 1, the lithium battery 30 includes a positive electrode 23, a negative electrode 22, a separator between the positive electrode 23 and the negative electrode 22, a battery container 25, and a sealing member sealing the battery container 25. An electrolyte (not shown) impregnates the positive electrode 23, the negative electrode 22, and the separator 24. The lithium battery 30 may be prepared by sequentially stacking the positive electrode 23, the negative electrode 22, and the separator 24 to form an electrode assembly, rolling the electrode assembly in a spiral shape and placing the electrode assembly in the battery container 25. The battery container 25 is sealed with the sealing member 26 and injected with the electrolyte to complete the lithium battery 30.

The present invention will now be described with reference to the following examples. The examples are presented for illustrative purposes only and are not intended to limit the scope of the invention.

Preparation Example 1

Preparation of Positive Electrode Active Material 47.31 g of $Li_2CO_3$, 0.2 g of $TiO_2$, and 0.37 g of $MgCO_3$ were mixed and stirred in 100 g of $Co_3O_4$ to obtain a mixture. The mixture was first heat treated at a temperature of 1005° C. for 20 hours in an air atmosphere. Then, the resulting mixture was slowly cooled down, and 0.40 g of $MgCO_3$ was mixed and stirred with 100 g of the first heat treated product. A second heat treatment was performed on the resultant product for 12 hours in an air atmosphere at 700° C.

After the second heat treatment, the resultant product was slowly cooled down to obtain $Li_{1.00}Mg_{0.0056}Ti_{0.0018}Co_{0.9926}O_2$. The amount of Mg increased from the center portion to the surface layer.

Preparation Example 2

Preparation of Positive Electrode Active Material 47.31 g of $Li_2CO_3$, 0.2 g of $TiO_2$, and 0.47 g of $MgCO_3$ were mixed and stirred in 100 g of $Co_3O_4$ to obtain a mixture. A first heat treatment was performed on the mixture for 20 hours in an air atmosphere at 1005° C. Then, the heat treated product was slowly cooled down, and 0.50 g of $MgCO_3$ was mixed and stirred with 100 g of the heat treated product. A second heat treatment was performed on the resultant product for 12 hours in an air atmosphere at 700° C.

After the second heat treatment, the resultant product was slowly cooled down to obtain $Li_{1.00}Mg_{0.0072}Ti_{0.0018}Co_{0.9910}O_2$. The amount of Mg increased from the center portion to the surface layer. The amount of Mg in the surface layer of the positive electrode active material was 3.61 parts by weight based on 1 part by weight of Mg in the center portion.

Preparation Example 3

Preparation of Positive Electrode Active Material 47.31 g of $Li_2CO_3$, 0.18 g of $TiO_2$, and 0.52 g of $MgCO_3$ were mixed and stirred in 100 g of $Co_3O_4$ to obtain a mixture. A first heat treatment was performed on the mixture for 20 hours in an air atmosphere at 1005° C. Then, the first heat treated product was slowly cooled down, and 0.56 g of $MgCO_3$ was mixed and stirred with 100 g of the heat treated product. A second heat treatment was performed on the resultant product for 12 hours in an air atmosphere at 700° C.

After the second heat treatment, the resultant product was slowly cooled down to obtain $Li_{1.00}Mg_{0.0081}Ti_{0.0016}Co_{0.9903}O_2$. The amount of Mg increased from the center portion to the surface layer.

Preparation Example 4

Preparation of Positive Electrode Active Material 47.31 g of $Li_2CO_3$, 0.18 g of $TiO_2$, and 0.97 g of $MgCO_3$ were mixed and stirred in 100 g of $Co_3O_4$ to obtain a mixture. A first heat treatment was performed on the mixture for 20 hours in an air atmosphere at 1005° C. to obtain $Li_{1.00}Mg_{0.0072}Ti_{0.0018}Co_{0.9910}O_2$.

Comparative Preparation Example 1

Preparation of Positive Electrode Active Material 47.31 g of $Li_2CO_3$, 0.2 g of $TiO_2$, and 0.47 g of $MgCO_3$ were mixed and stirred in 100 g of $Co_3O_4$ to obtain a mixture. A first heat treatment was performed on the mixture for 20 hours in an air atmosphere at 1005° C. to obtain $Li_{1.00}Mg_{0.0036}Ti_{0.0018}Co_{0.9946}O_2$.

Comparative Preparation Example 2

Preparation of Positive Electrode Active Material 47.31 g of $Li_2CO_3$, 0.18 g of $TiO_2$, and 0.52 g of $MgCO_3$ were mixed and stirred in 100 g of $Co_3O_4$ to obtain a mixture. A first heat treatment was performed on the mixture for 20 hours in an air atmosphere at 1005° C. to obtain $Li_{1.00}Mg_{0.0040}Ti_{0.0018}Co_{0.9944}O_2$.

Comparative Preparation Example 3

Preparation of Positive Electrode Active Material 47.31 g of $Li_2CO_3$, 0.18 g of $TiO_2$, and 0.63 g of $MgCO_3$ were mixed and stirred in 100 g of $Co_3O_4$ to obtain a mixture. A first heat treatment was performed on the mixture for 20 hours in an air atmosphere at 1005° C. Then, the heat treated product was slowly cooled down, and 0.67 g of $MgCO_3$ was mixed and stirred with 100 g of the heat treated product. A second heat treatment was performed on the resultant product for 12 hours in an air atmosphere at 700° C.

After the second heat treatment, the resultant product was slowly cooled down to obtain $Li_{1.00}Mg_{0.0081}Ti_{0.0016}Co_{0.9888}O_2$.

The capacity and efficiency of the positive electrode active materials prepared according to Comparative Preparation Example 3 are lower than those of the positive electrode active materials prepared according to Preparation Examples 1 through 3.

Example 1

Preparation of Positive Electrode, and Coin Cell and Full Cell Using the Positive Electrode (1) Preparation of Coin Cell 96 g of the positive electrode active material of Preparation Example 1, 2 g of polyvinylidene fluoride, and 2 g of carbon black were dispersed in 47 g of N-methylpyrrolidone to prepare a composition for a positive electrode active material. In the composition, a mixture weight ratio of the positive electrode active material, the polyvinylidene fluoride, and carbon black was 96:2:2.

The composition was coated on aluminum foil to a thickness of 12 μm to prepare a thin electrode plate, and the thin electrode plate was dried for 3 hours at 135° C. and pressed to prepare a positive electrode.

Then, lithium metal was used as the counter electrode to prepare a CR 2016 type coin cell. A porous polyethylene (PE) separator having a thickness of about 16 μm was disposed between the positive electrode and the lithium metal counter electrode, and an electrolyte solution was injected to prepare a CR2016 type coin cell.

The electrolyte solution was a solution including 1.1 M $LiPF_6$ dissolved in a solvent obtained by mixing ethylenecarbonate (EC), ethylmethylcarbonate (EMC), 4-fluorobenzene (FB), and dimethylcarbonate (DMC) at a volume ratio of 3:5:1:1.

(2) Preparation of Full Cell 97.4 g of the positive electrode active material of Preparation Example 1, 1.3 g of polyvinylidene fluoride, and 1.3 g of carbon black were dispersed in 33 g of N-methylpyrrolidone to form a composition for a positive electrode active material.

In the composition, the mixture weight ratio of the positive electrode active material, the polyvinylidene fluoride, and carbon black was 97.4:1.3:1.3.

The composition was coated on aluminum foil to a thickness of 12 μm to prepare a thin electrode plate, and the thin electrode plate was dried for 3 hours at 135° C. and pressed to prepare a positive electrode.

Then, 96 g of 100% natural graphite as a negative electrode active material, 2 g of styrene-butadiene rubber as a binder, and 2 g of carboxymethylcellulose as a thickener were dispersed in 150 g of water to prepare a composition for a negative electrode active material.

The composition was coated on copper foil to a thickness of 8 μm to prepare a thin electrode plate, and the thin electrode plate was dried for 3 hours at 135° C. and pressed to prepare a negative electrode.

A porous PE separator having a thickness of about 16 μm was disposed between the positive electrode and the negative electrode to form an electrode assembly. The electrode assembly was rolled and compressed, and then inserted in a rectangular can. Then, an electrolyte solution was injected into the rectangular can to prepare a full cell.

The electrolyte solution was a solution including 1.1 M $LiPF_6$ dissolved in a solvent obtained by mixing EC, EMC, FB, and DMC at a volume ratio of 3:5:1:1.

Examples 2 through 4

Preparation of Positive Electrode, and Coin Cell and Full Cell using the Same

Example 2

A lithium secondary battery was prepared in the same manner as in Example 1, except that the positive electrode active material of Preparation Example 2 was used instead of the positive electrode active material of Preparation Example 1.

Example 3

A lithium secondary battery was prepared in the same manner as in Example 1, except that the positive electrode active material of Preparation Example 3 was used instead of the positive electrode active material of Preparation Example 1.

Example 4

A lithium secondary battery was prepared in the same manner as in Example 1, except that the positive electrode active material of Preparation Example 4 was used instead of the positive electrode active material of Preparation Example 1.

Comparative Example 1 and 2

Preparation of Positive Electrode and Lithium Secondary Battery Using the Same

Comparative Example 1

A positive electrode and a lithium secondary battery were prepared in the same manner as in Example 1, except that the positive electrode active material of Comparative Preparation Example 1 was used instead of the positive electrode active material of Preparation Example 1.

Comparative Example 2

A positive electrode and a lithium secondary battery were prepared in the same manner as in Example 1, except that the positive electrode active material of Comparative Preparation Example 2 was used instead of the positive electrode active material of Preparation Example 1.

The characteristics of the coin cells of Examples 1 through 4 and Comparative Examples 1 and 2 were evaluated and the results are shown in Tables 1 and 2.

(1) Initial Charge Capacity and Initial Charge and Discharge Efficiency

Each of the coin cells of Examples 1 through 4 and Comparative Examples 1 and 2 was initially charged until a voltage reached 4.2 V at a C-rate of 0.1 C (unit: mA/g), and then was further charged until the current reached 0.01 C at a constant voltage of 1.0 V. Then, each of the coin cells rested for 10 minutes. Next, each coin half cell was discharged until the voltage reached 3.0 V at a rate of 0.1 C. The charging and discharging characteristics at this time are shown in Table 2.

Initial charge and discharge efficiency is calculated according to Equation 1 below.

Initial Charge and Discharge Efficiency (%)=Initial Discharge Capacity/Initial Charge Capacity×100    Equation 1

(2) 1.0 C Discharge Capacity Rate Compared to 0.1 C (Shown as "1.0 C/0.1 C" in Table 1)

Each of the coin cells of Examples 1 through 4 and Comparative Examples 1 and 2 was charged at a constant current of 0.1 C and a constant voltage of 4.2 V (0.01 C cut-off). Then, each of the coin cells rested for 10 minutes, and was discharged until the voltage reached 3.0 V under a constant current of 0.1 C or 1 C. In other words, the discharging characteristics of each of the coin cells were evaluated by changing the charging and discharging rates, respectively, to 0.1 C and 1.0 C, and the 1.0 C/0.1 C discharge capacity ratio was calculated according to Equation 2 below. The results are also shown in Table 2 below.

1 C Discharge Capacity Ratio Compared to 0.1 C (%)=(Discharge Capacity when Cell is Discharged at Rate of 1.0 C)/(Discharge Capacity when Cell is Discharged at Rate of 0.1 C)×100    Equation 2

(3) 1.0 C Discharge Capacity Ratio After 10 Cycles of 1.0 C Charge/Discharge Lifetime (Shown as "1 C $10^{th}/1^{st}$" in Table 2)

Each of the coin cells of Examples 1 through 4 and Comparative Examples 1 and 2 was charged under a constant current of 1 C and a constant voltage of 1.0 V (0.01 C cut-off). Then, each of the coin cells rested for 10 minutes, and was charged and discharged 10 times under a constant current of 1 C (2.5 V cut-off). In other words, the lifetime characteristics of each coin cell were evaluated by changing the discharge capacity according to the number of charging and discharging cycles.

(4) 1.0 C Discharge Capacity Ratio after 30 Cycles of 1.0 C Charging/Discharging Lifetime (Shown as "1 C $30^{th}/1^{st}$" in Table 2)

Each of the coin cells of Examples 1 through 4 and Comparative Examples 1 and 2 was charged under a constant current of 1 C and a constant voltage of 1.0 V (0.01 C cut-off). Then, each of the coin cells rested for 10 minutes, and was charged and discharged 30 times under a constant current of 1 C (2.5 V cut-off). In other words, the lifetime characteristics of each coin cell were evaluated by changing the discharge capacity according to the number of charging and discharging cycles.

TABLE 1

| | Ex. 1 | Ex. 2 | Ex. 3 | Ex. 4 | Comp. Ex. 1 | Comp. Ex. 2 | Comp. Ex. 3 |
|---|---|---|---|---|---|---|---|
| Mg/Ti (wt %) | 0.14/0.09 | 0.18/0.09 | 0.20/0.08 | 0.18/0.09 | 0.09/0.09 | 0.10/0.08 | 0.24/0.08 |
| Mg/Ti (mol %) | 0.56/0.18 | 0.72/0.18 | 0.81/0.16 | 0.72/0.18 | 0.36/0.16 | 0.40/0.16 | 0.96/0.16 |
| Mg/Ti (Mole Ratio) | 3.1 | 4.0 | 5.1 | 4.0 | 2.3 | 2.5 | 6.0 |
| Mg Concentration Gradient | Yes | Yes | Yes | No | No | No | Yes |
| Initial Charge Capacity (0.1 C mAh/g) | 162.54 | 162.03 | 160.93 | 162.45 | 161.72 | 161.21 | 159.47 |
| Initial Discharge Capacity (0.1 C, mAh/g) | 158.68 | 158.60 | 157.53 | 159.07 | 157.96 | 157.43 | 153.16 |
| 1.0 C Discharge Capacity (mAh/g) | 143.09 | 144.92 | 142.87 | 145.36 | 141.04 | 140.75 | 138.36 |
| Discharge Capacity after $10^{th}$ Cycle (mAh/g) | 135.71 | 138.68 | 136.64 | 135.49 | 129.84 | 130.52 | 132.23 |
| Discharge Capacity after $30^{th}$ Cycle (mAh/g) | 123.60 | 134.20 | 132.48 | 120.86 | 98.83 | 104.36 | 129.15 |

TABLE 2

| | Ex. 1 | Ex. 2 | Ex. 3 | Ex. 4 | Comp. Ex. 1 | Comp. Ex. 2 | Comp. Ex. 3 |
|---|---|---|---|---|---|---|---|
| Mg/Ti (wt %) | 0.14/0.09 | 0.18/0.09 | 0.20/0.08 | 0.18/0.09 | 0.09/0.09 | 0.10/0.08 | 0.24/0.08 |
| Mg/Ti (mol %) | 0.56/0.18 | 0.72/0.18 | 0.81/0.16 | 0.72/0.18 | 0.36/0.16 | 0.40/0.16 | 0.96/0.16 |
| Mg/Ti (Mole Ratio) | 3.1 | 4.0 | 5.1 | 4.0 | 2.3 | 2.5 | 6.0 |
| Mg Concentration Gradient | Yes | Yes | Yes | No | No | No | Yes |
| Initial Charge Capacity (mAh/g) | 162.54 | 162.03 | 160.93 | 162.45 | 161.72 | 161.21 | 159.47 |
| Initial Charge and Discharge Efficiency (%) | 97.63 | 97.88 | 97.89 | 97.92 | 97.67 | 97.60 | 96.04 |
| 1.0 C/0.1 C (%) | 90.18 | 91.37 | 90.69 | 91.38 | 89.29 | 89.46 | 90.34 |
| 1 C 10th/1st (%) | 94.84 | 95.69 | 95.64 | 93.21 | 92.06 | 92.73 | 95.57 |
| 1 C 30th/1st (%) | 86.38 | 92.6 | 92.73 | 83.15 | 70.14 | 74.15 | 93.34 |

Referring to Table 1, the capacities of the coin cells of Examples 1 and 2 are higher than those of Comparative Examples 1 and 2.

Also, referring to Table 2, the charge/discharge capacities of the coin cells of Examples 1 through 4 are better than those of Comparative Examples 1 and 2. Also, when the ratio of Mg/Ti is from 3.1 to 4.9, the initial efficiency, 1.0 C efficiency compared to 0.1 C, and capacity retention rate are improved.

Also, the lifetime characteristics of Example 1 (having a concentration gradient of Mg) are improved compared to the lifetime characteristics of Example 4 (having no concentration gradient of Mg).

Figure 2:
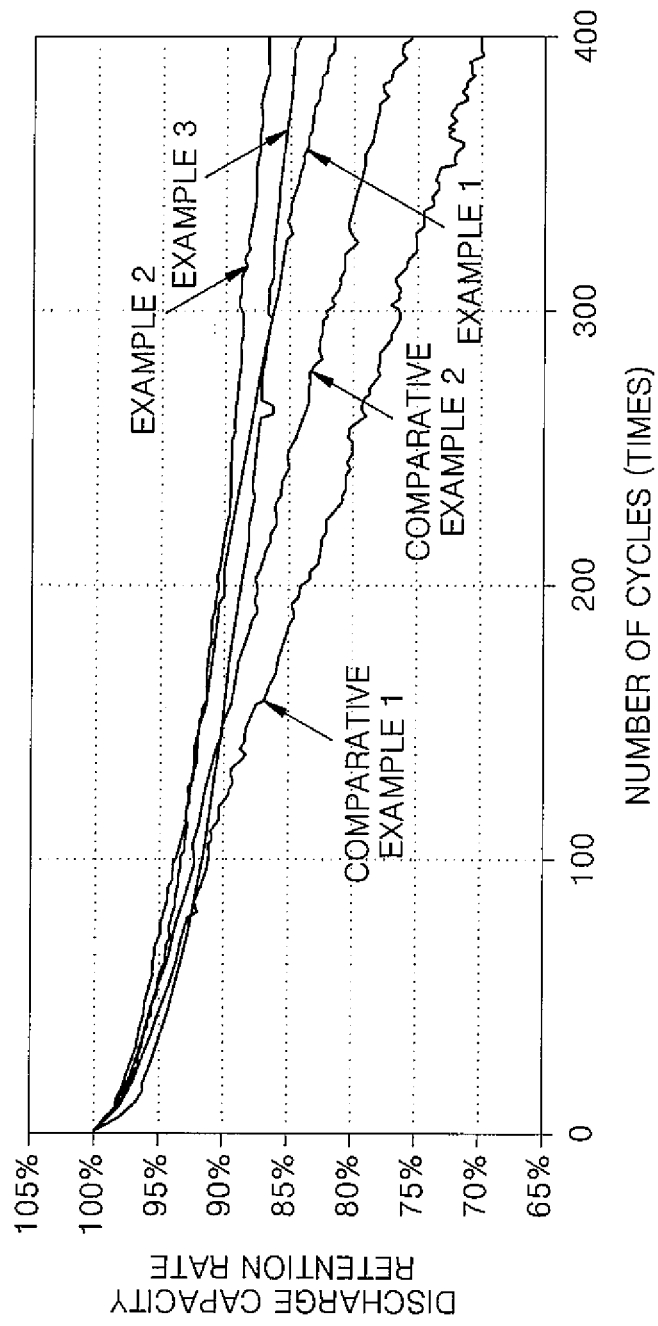
FIG. 2 is a graph comparing the discharge capacity retention rates of the battery cells prepared according to Examples 1 through 3 and Comparative Examples 1 and 2.
Figure 3:
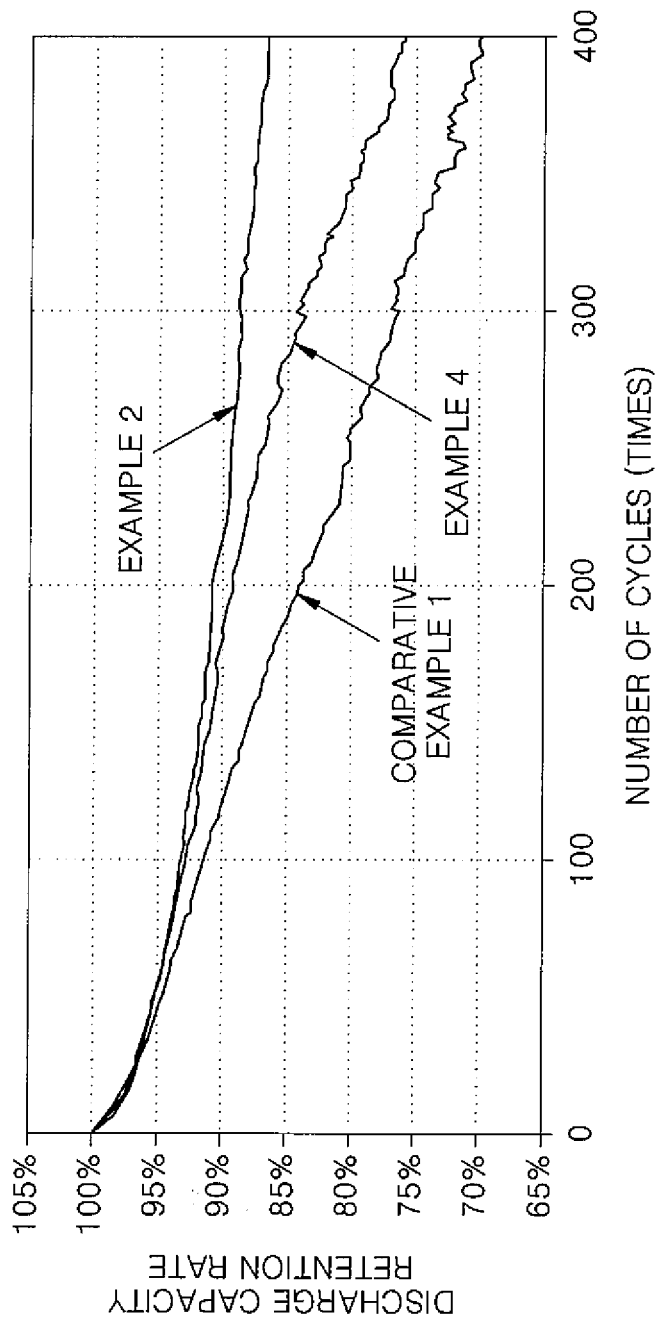
FIG. 3 is a graph comparing the discharge capacity retention rates of the battery cells prepared according to Examples 2 and 4, and Comparative Example 1.

Lifetime tests were performed on the full cells of Examples 1 through 4 and Comparative Examples 1 and 2, and the results of the lifetime tests are shown in FIGS. 2 and 3. FIG. 2 graphs the results of the full cells of Examples 1 through 3 and Comparative Examples 1 and 2, and FIG. 3 graphs the results of the full cells of Examples 2 and 4, and Comparative Example 1.

Referring to FIG. 2, the lifetime characteristics of the full cells of Examples 1 through 3 are improved compared to those of Comparative Examples 1 and 2. Also, referring to FIG. 3, the lifetime characteristics of the full cells of Examples 2 and 4 are improved compared to that of Comparative Example 1.

According to embodiments of the present invention, by controlling a mixture ratio of an alkali earth metal and a transition metal, a positive electrode active material for a lithium secondary battery has good lifetime characteristics and capacity characteristics. Since such a positive electrode active material can be made using simple preparation processes, it may be easily prepared.

By employing a positive electrode using the positive electrode active material according to embodiments of the present invention, a lithium secondary battery may have improved lifetime characteristics.

While the present invention has been illustrated and described with reference to certain exemplary embodiments, it is understood by those of ordinary skill in the art that various changes and modifications to the described embodiments may be made without departing from the spirit and scope of the present invention as defined by the following claims.

What is claimed is:

1. A positive electrode active material for a lithium secondary battery, the positive electrode active material comprising a material represented by Formula 1:

$$Li_xM'_yM''_zCo_{1-y-z}O_2 \quad \text{Formula 1}$$

wherein, M' is magnesium (Mg), M" is titanium (Ti), $0.95 \leq x \leq 1.05$, $0.0056 \leq y \leq 0.0081$, $0.0016 \leq z \leq 0.0018$, and $3.1 \leq y/z \leq 5.1$, wherein the positive electrode active material comprises a concentration gradient of M' from a surface layer to a center portion of the positive electrode active material.

2. The positive electrode active material of claim 1, wherein y/z is 3.1, 4.0, or 5.1.

3. The positive electrode active material of claim 1, wherein the material represented by Formula 1 is $Li_{1.00}Mg_{0.0072}Ti_{0.0018}Co_{0.9910}O_2$, $Li_{1.00}Mg_{0.0056}Ti_{0.0018}Co_{0.9926}O_2$, or $Li_{1.00}Mg_{0.0081}Ti_{0.0016}Co_{0.9903}O_2$.

4. The positive electrode active material of claim 1, wherein in the concentration gradient of M', an amount of M' gradually increases from a center portion to a surface layer of the positive electrode active material.

5. The positive electrode active material of claim 4, wherein a weight ratio of M' in the surface layer and M' in the center portion is about 3:1 to about 5:1.

6. The positive electrode active material of claim 1, wherein in the concentration gradient of M' an amount of the Mg gradually increases from a center portion to a surface layer of the positive electrode active material.

7. The positive electrode active material of claim 4, wherein a weight ratio of Mg in the surface layer to Mg in the center portion is about 3.26:1 to about 3.86:1.

8. A method of preparing the positive electrode active material for a lithium secondary battery of claim 1, the method comprising:
    mixing a lithium salt, a Ti precursor, and Mg salt to form a mixture; and
    performing a first thermal treatment on the mixture at a temperature of about 150° C. to about 1050° C.

9. The method of claim 8, further comprising performing a second thermal treatment on the mixture at a temperature of about 150° C. to about 1000° C.

10. A positive electrode comprising the positive electrode active material of claim 1.

11. A lithium secondary battery comprising:
    a positive electrode comprising the positive electrode active material of claim 1;
    a negative electrode; and
    a separator between the positive and negative electrodes.

* * * * *